March 4, 1969     T. O. HOPPER     3,431,394
WATER HEATING UNIT FOR STOCK TANKS
Filed Jan. 3, 1967
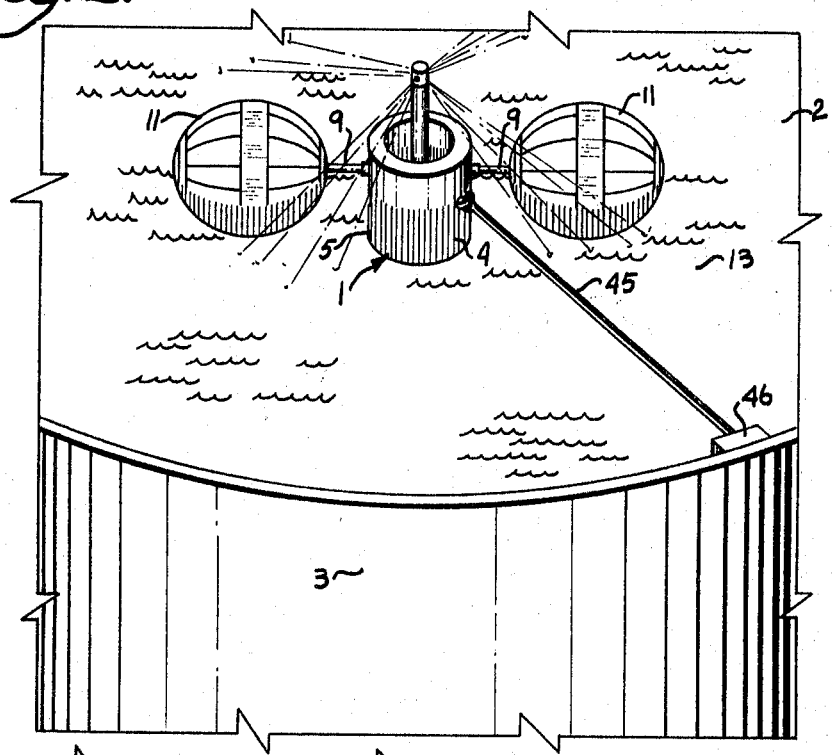
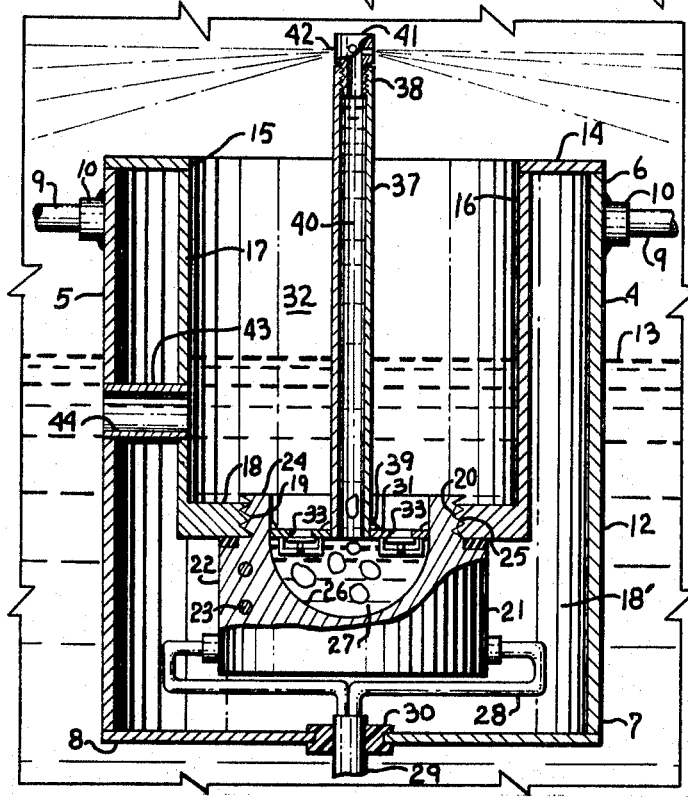
INVENTOR.
THOMAS O. HOPPER
BY Frishkwn and Hold
ATTORNEYS United States Patent Office 3,431,394
Patented Mar. 4, 1969

3,431,394
WATER HEATING UNIT FOR STOCK TANKS
Thomas O. Hopper, 145 N. Grant,
Colby, Kans. 67701
Filed Jan. 3, 1967, Ser. No. 606,639
U.S. Cl. 219—317                                    6 Claims
Int. Cl. H05b 3/78; A01k 7/00

ABSTRACT OF THE DISCLOSURE

This disclosure describes a cup-like device adapted to float on the surface of water although the water is permitted to enter therewithin. The device includes a closed heating chamber near the bottom into which the water flows and a valve structure cooperating with the chamber for sealing same when the water boils therewithin. The boiling periodically forces heated water upwardly through a hollow stem communicating with the chamber and then through a spray nozzle directed over the water surface for maintaining the surface free of ice formation. The device is described in combination with a conventional tank valve which functions to maintain the liquid surface at a desired level in the tank.

---

This invention relates to novel heating devices, and more particularly, to devices particularly adapted to prevent surface freezing of exposed water, such as in stock watering tanks.

Tank heaters adapted to prevent the freezing of water in cold weather are known, however, as presently constructed they exhibit one or more disadvantages, for example, excessive power requirements, complex and expensive construction, mounting difficulties with respect to the tank, and a tendency to be unreliable in use.

The principal objects of the present invention are: to provide a stock tank heating device which is highly economical in the use of power for preventing the formation of ice on the water surface; to provide such a device which is simple and inexpensive in construction; to provide such a device which is reliable in operation and requires no mounting on the tank in that it may merely replace a portion of the tank float valve assembly already present; and to provide such a device which is well adapted for its intended purpose.

Other objects and advantages of this invention will become apparent from the following description taken in connection with the accompanying drawings wherein are set forth by way of illustration and example certain embodiments of this invention.

FIG. 1 is a fragmentary perspective view showing a device embodying this invention floating on the surface of water in a stock tank.

FIG. 2 is a fragmentary vertical cross-sectional view on an enlarged scale through the device, particularly showing the relationship of internal parts.

FIG. 3 is a fragmentary vertical cross-sectional detail view on a further enlarged scale showing the construction of a typical valve forming part of the device.

Referring to the drawings in more detail:

The reference numeral 1 generally indicates a device embodying this invention for heating water 2 contained in a conventional stock watering tank 3. The device 1 comprises an outer shell 4 having a vertical, cylindrical side wall 5 with a top portion 6 and a bottom portion 7, and a bottom wall 8 enclosing the bottom portion 7 in the manner of a lower lid. A pair of support rods 9 are suitably secured to the outer shell side wall 5, in this example by welding threaded receivers 10 to the side wall 5 in opposed positions adjacent the top portion 6. The support rods 9 are screwed into the receivers 10 whereupon the rods 9 extend radially outwardly from the side wall 5 as best indicated in FIG. 1. A float member 11 of any suitable type is mounted on the outer ends of each of the support rods 9 and are, therefore, spaced radially outwardly of the outer shell side wall 5. The float members 11 maintain the device 1 floating in the water with the lower part 12 of the side wall 5 submerged below the water surface 13.

An annular top wall 14 is suitably secured to the side wall 5 near the top portion 6 and extends radially inwardly therefrom defining an inner circular rim 15. An inner shell 16 has a cylindrical side wall 17, of smaller diameter than the outer shell side wall 5, and a bottom wall 18. The inner shell side wall 17 is coaxially secured to the top wall 14 at the inner rim 15 and depends therefrom, as best illustrated in FIG. 2. The inner shell bottom wall 18 is spaced above the outer shell bottom wall 8 forming a space 18′ therebetween and has an internal screw thread 19 defining an opening 20 extending upwardly therethrough.

A heating unit 21 of suitable heat transmitting material has a body 22 including an internal electrical resistance heating element 23 and an upwardly projecting central tubular portion 24. An external screw thread 25 is cut into the tubular portion 24 and engages the internal thread 19 of the bottom wall 18, supporting the unit 21 below the bottom wall 18.

A depression 26 extends downwardly into the body 22 within the tubular portion 24 and forms a heating chamber 27 in the body 22. Suitable electrical conduit or cord 28 is electrically connected with the heating element 23 within the heating unit 21 and extends downwardly into a suitable waterproof sheath 29. The sheath 29 extends through and is maintained in sealing engagement with a sealing grommet 30 filling a suitable opening in the bottom wall 8. The sheath 29 with the electrical cord 28 therewithin may be directed through the water 2 to a suitable source (not shown) of electric current to produce heat within the chamber 27.

A horizontal closure wall 31 is secured to the body 22 over the depression 26 thus, except for structure not described, isolating the heating chamber 27 from the interior 32 of the inner shell 16. The closure wall 31 has a plurality of passageway means or openings 33 extending downwardly therethrough. Valve means, in this example poppet valves 34, are associated with the openings 33 and each comprises a cage 35 fixed to the wall 31 and extending downwardly therefrom, the cage loosely containing a disc 36 of greater diameter than the respective opening 33. When a disc 36 is positioned upwardly against the upper side of the wall 31 within a cage 35, the respective opening 33 is closed whereupon liquid may not flow upwardly therepast. However, when the disc 36 is resting at the lower portion of the cage away from the wall 31 the respective opening 33 is clear, allowing liquid to flow downwardly or upwardly through the opening. A sudden increase in pressure within the chamber 27 will induce flow upwardly through the respective opening 33, causing the respective disc 36 to move upwardly against the wall 31 and thereby sealing the opening 33 so long as the pressure within the chamber 27 remains greater than the pressure on the upper side of the wall 31.

A vertically extending elongated hollow percolating stem 37 has an upper end 38 and a lower end 39. The stem 37 is secured at the lower end 39 to the wall 31 and extends upwardly therefrom with the upper end 38 being positioned above the top wall 14 as best illustrated in FIG. 2. The stem 37 forms a passageway 40 therein which is the only passageway communicating with the heating chamber 27 when the valves 34 are closed. A spray nozzle 41 is secured to the stem upper end 38 and communicates with the passageway 40. The nozzle 41 has a plurality of horizontally and radially directed openings 42 therearound which are adapted to direct heated water, forced upwardly through the passageway 40, over the top wall 14 and onto the surface 13 of the water in the area surrounding the device 1.

A short tube 43 extends between and is secured respectively to the outer shell side wall 5 and inner shell side wall 17 within the lower part 12, that is the portion submerged below the surface 13 of the water. The tube 43 is open at both ends forming a passageway 44 through the side walls providing communication from the outside of the device to the interior 32 of the inner shell for filling same with water to the level of the outside surface 13. A quantity of the water within the interior 32 finds its way through the open passageways 33 into the chamber 27, filling same.

In operation, the device 1 is preferably loosely connected to a generally horizontally extending rigid rod 45 forming part of a conventional float tank valve 46. The valve 46 is of the type which opens to permit entry of water from a source (not shown) into the tank when the rod 45 is permitted to drop or pivot downwardly. The device 1 provides a substitute for a conventional float member which would normally be secured to the free end of the rod 45. The rod 45, in turn, maintains the device 1 in a desirable position for efficient operation, that is in the center of a relatively small tank and spaced from the walls in proper relation with like devices in a larger tank.

In operation, with the chamber 27 filled with water and electric current directed through the heating element 23, the unit 21 becomes heated above the boiling temperature of water, causing the water in the chamber 27 to suddenly boil. When this occurs the sudden increase in pressure within the chamber closes the valves 34 causing the pressure to further rise within the chamber forcing water, a portion of which has found its level within the passageway 40, to be urged violently upwardly into and through the nozzle 41 and sent outwardly in several directions simultaneously against the surface 13 of the water. This heats the surface of the water and also keeps it in motion, thereby discouraging the formation of a crust of ice thereon in cold weather. Pressure is rapidly relieved in the chamber 27 when steam begins to exhaust from the spray nozzle 41, permitting the pressure exerted by the water downwardly on the valves 34 to open same, thus allowing a quantity of water to enter into the chamber 27, cooling the interior and further drawing water in, and the cycle is repeated.

It is to be understood that while one form of this invention has been illustrated and described it is not to be limited thereto except insofar as such limitations are included in the following claims.

What I claim and desire to secure by Letters Patent is:

1. A device for heating liquid comprising:
    (a) a heating unit having a body including a heating element, a depression extending into said body and forming a heating chamber, floating means supporting said body below the surface of said liquid,
    (b) said heating unit including a closure wall secured to said body adjacent said depression and isolating said heating chamber from the liquid, said closure wall being exposed to the liquid and having passageway means therethrough, valve means associated with said heating unit and adapted to close said closure wall passageway means upon a sudden rise of pressure in said heating chamber and open said closure wall passageway means upon a drop in pressure in said heating chamber permitting liquid to enter thereinto,
    (c) an upwardly extending hollow percolating stem having an upper end projecting above the surface of said liquid said stem being associated with said heating unit and forming a passageway communicating with said heating chamber,
    (d) a nozzle associated with said stem upper end and communicating with said stem passageway, said nozzle having openings directed toward the surface of the liquid, and a source of heat producing power connected to said heating element, whereby,
    (e) water enters said heating chamber through said passageway means and, upon boiling, is periodically directed through said nozzle and toward the surface of the liquid.

2. The device as set forth in claim 1 wherein said floating means comprises:
    (a) an outer shell having a vertical cylindrical side wall with top portion and a bottom portion and a bottom wall enclosing said bottom portion,
    (b) an annular top wall secured to said side wall near said top portion and extending radially inwardly therefrom defining an inner circular rim,
    (c) an inner shell having a cylindrical side wall of smaller diameter than said outer shell side wall and a bottom wall, said inner shell side wall being coaxially secured to said top wall at said inner rim and depending therefrom, said inner shell bottom wall being spaced above said outer shell bottom wall and supporting said heating unit therebeneath with said closure wall exposed within said inner shell, and
    (d) passageway means permitting liquid to enter within said inner shell.

3. The device as set forth in claim 1 wherein said floating means includes:
    (a) container means having a side wall, a pair of support rods fixed to said wall and extending outwardly therefrom, and
    (b) a float member mounted on each of said support rods and spaced outwardly of said side wall.

4. The device as set forth in claim 2 wherein:
    (a) said inner shell bottom wall has an internal screw thread defining an opening extending upwardly therethrough,
    (b) said heating unit body includes an upwardly projecting central tubular portion, an external screw thread on said tubular portion and engaging said internal thread for mounting said heating unit on said inner shell bottom wall above said outer shell bottom wall,
    (c) said depression extending downwardly into said body within said tubular portion, and
    (d) said horizontal closure wall is secured to said body over said depression.

5. The device as set forth in claim 1 wherein:
    (a) said stem is rigid and has a lower end,
    (b) said stem being secured to said closure wall at said lower end.

6. The device as set forth in claim 2 wherein:
    (a) said last named passageway means comprises a tube extending between said outer shell side wall and inner shell side wall,
    (b) said tube being open at both ends and positioned below the surface of the liquid.

References Cited

UNITED STATES PATENTS

| | | | |
|---|---|---|---|
| 1,166,372 | 12/1915 | Herzinger | 126—360 |
| 1,241,555 | 10/1917 | Riemenschneider | 126—360 |
| 2,162,314 | 6/1939 | Perri | 119—73 |
| 2,472,178 | 6/1949 | Temple | 219—317 |
| 2,691,363 | 10/1954 | Stuva | 119—73 |
| 3,044,445 | 7/1962 | Terry et al. | 119—78 X |

RICHARD M. WOOD, *Primary Examiner.*

C. L. ALBRITTON, *Assistant Examiner.*

U.S. Cl. X.R.

119—73, 78; 126—360; 219—335, 336